(12) United States Patent
Miura et al.

(10) Patent No.: US 11,754,885 B2
(45) Date of Patent: Sep. 12, 2023

(54) LIGHT TRANSMISSION CONTROL FILM AND LAMINATED GLASS

(71) Applicant: DAI NIPPON PRINTING CO., LTD., Tokyo (JP)

(72) Inventors: Keisuke Miura, Tokyo (JP); Yusuke Nushi, Tokyo (JP); Yusuke Hagiwara, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/775,438

(22) PCT Filed: Nov. 11, 2016

(86) PCT No.: PCT/JP2016/083568
§ 371 (c)(1),
(2) Date: May 11, 2018

(87) PCT Pub. No.: WO2017/082403
PCT Pub. Date: May 18, 2017

(65) Prior Publication Data
US 2018/0307077 A1    Oct. 25, 2018

(30) Foreign Application Priority Data

Nov. 13, 2015 (JP) .................. 2015-223394
Oct. 27, 2016 (JP) .................. 2016-210662

(51) Int. Cl.
*G02F 1/1339* (2006.01)
*E06B 3/67* (2006.01)
(Continued)

(52) U.S. Cl.
CPC ........ *G02F 1/13394* (2013.01); *E06B 3/6722* (2013.01); *E06B 9/24* (2013.01);
(Continued)

(58) Field of Classification Search
CPC combination set(s) only.
See application file for complete search history.

(56) References Cited

U.S. PATENT DOCUMENTS 6,396,559 B1 * 5/2002 Kishimoto .......... G02F 1/13394
    349/123
6,650,393 B1 * 11/2003 Nishiguchi ........... G02F 1/1339
    349/156
(Continued)

FOREIGN PATENT DOCUMENTS

CN    1282066 A    1/2001
CN    101013215 A    8/2007
(Continued)

OTHER PUBLICATIONS

Jan. 24, 2017 International Search Report issued in International Patent Application No. PCT/JP2016/083568.
(Continued)

*Primary Examiner* — Lauren Nguyen
(74) *Attorney, Agent, or Firm* — Oliff PLC

(57) ABSTRACT

The present invention is to enable avoidance of a reduction in external appearance quality, and stable driving, and prevent diffracted light from being discerned by avoiding a reduction in transmittance and a deterioration in liquid crystal alignment. A light control film is provided with: a first laminate in which an alignment layer is provided; a second laminate in which an alignment layer is provided; a liquid crystal layer which is sandwiched between the first and second laminates and contains liquid crystal molecules; a spacer disposed in the liquid crystal layer to hold the thickness of the liquid crystal layer; and electrodes provided in the first laminate and/or the second laminate, and controls transmitted light by controlling the alignment of the liquid crystal molecules driven by the electrodes. The proportion of
(Continued)

an area occupied by the spacer per unit area in a light controllable-region of the liquid crystal layer is 0.1-10%.

11 Claims, 12 Drawing Sheets

(51) Int. Cl.
*E06B 9/24* (2006.01)
*G02F 1/1337* (2006.01)
*G02F 1/137* (2006.01)
*B60J 1/00* (2006.01)
*B60J 3/04* (2006.01)

(52) U.S. Cl.
CPC ........ *G02F 1/1337* (2013.01); *G02F 1/13392* (2013.01); *G02F 1/13725* (2013.01); *B60J 1/001* (2013.01); *B60J 3/04* (2013.01); *E06B 2009/2417* (2013.01); *E06B 2009/2464* (2013.01); *G02F 1/13398* (2021.01)

(56) References Cited

U.S. PATENT DOCUMENTS

| | | | |
|---|---|---|---|
| 7,623,203 | B2 | 11/2009 | Hayashi et al. |
| 7,652,743 | B2 | 1/2010 | Watanabe |
| 2006/0098290 | A1 | 5/2006 | Fernando et al. |
| 2007/0002262 | A1 | 1/2007 | Kawabe |
| 2007/0177073 | A1 | 8/2007 | Seo et al. |
| 2008/0094551 | A1* | 4/2008 | Hayashi ............ G02F 1/13475 349/106 |
| 2009/0046239 | A1* | 2/2009 | Watanabe .......... G02F 1/13394 349/157 |
| 2009/0279040 | A1* | 11/2009 | Chu .................. G02F 1/13394 349/155 |

FOREIGN PATENT DOCUMENTS

| | | | | |
|---|---|---|---|---|
| CN | 101957521 | A | | 1/2011 |
| CN | 102967967 | A | | 3/2013 |
| CN | 10-4460141 | | * 3/2015 | ........... G02F 1/1347 |
| EP | 1072931 | A2 † | 1/2001 | |
| JP | H03-047392 | A | | 2/1991 |
| JP | H03-158827 | A | | 7/1991 |
| JP | H04-051221 | A | | 2/1992 |
| JP | H04-293016 | A | | 10/1992 |
| JP | H04-366921 | A | | 12/1992 |
| JP | H06-273727 | A | | 9/1994 |
| JP | H07-20479 | A | | 1/1995 |
| JP | H08-184273 | A | | 7/1996 |
| JP | 2000-147513 | A | | 5/2000 |
| JP | 2001-042349 | A | | 2/2001 |
| JP | 2004-070069 | A | | 3/2004 |
| JP | 2004070069 | A2 † | 3/2004 | |
| JP | 2004-333567 | A | | 11/2004 |
| JP | 2007-010843 | A | | 1/2007 |
| JP | 2007-515661 | A | | 6/2007 |
| JP | 2008-102341 | A | | 5/2008 |
| JP | 2009-036967 | A | | 2/2009 |
| JP | 2009-216976 | A | | 9/2009 |
| JP | 2010-208861 | A | | 9/2010 |
| JP | 2011-186453 | A | | 9/2011 |
| JP | 2012-150206 | A | | 8/2012 |
| JP | 2013-044897 | A | | 3/2013 |
| JP | 2013-130746 | A | | 7/2013 |
| JP | 2014-149319 | A | | 8/2014 |
| JP | 2014-182287 | A | | 9/2014 |
| KR | 10-2001-0015442 | A | | 2/2001 |
| WO | 2006/077838 | A1 | | 7/2006 |
| WO | 2014/081653 | A1 | | 5/2014 |

OTHER PUBLICATIONS

Jan. 17, 2017 Office Action issued in Japanese Patent Application No. JP 2016-210662.
Apr. 25, 2017 Office Action issued in Japanese Patent Application No. JP 2016-210662.
Sep. 11, 2018 Office Action issued in Japanese Patent Application No. 2018-117918.
Nov. 20, 2018 Office Action issued in Japanese Patent Application No. 2018-117918.
Sep. 11, 2018 Office Action issued in Japanese Patent Application No. 2017-142688.
Dec. 17, 2019 Office Action issued in Japanese Patent Application No. 2019-029944.
May 26, 2020 Notice of Submission of Publications issued in Japanese Patent Application No. 2019-029944.
Jul. 28, 2020 Office Action issued in Chinese Patent Application No. 201680066053.0.
Sep. 3, 2021 Office Action issued in Chinese Patent Application No. 201680066053.0.
Dec. 14, 2021 Office Action issued in Japanese Application No. 2021-001912.
Mar. 20, 2023 Office Action issued in Korean Patent Application No. 10-2018-7014980.
Mar. 20, 2023 Third Party Observations filed in Korean Patent Application No. 10-2018-7014980.
Jul. 4, 2023 Office Action issued in corresponding Japanese Patent Application No. 2022-127988.

* cited by examiner
† cited by third party

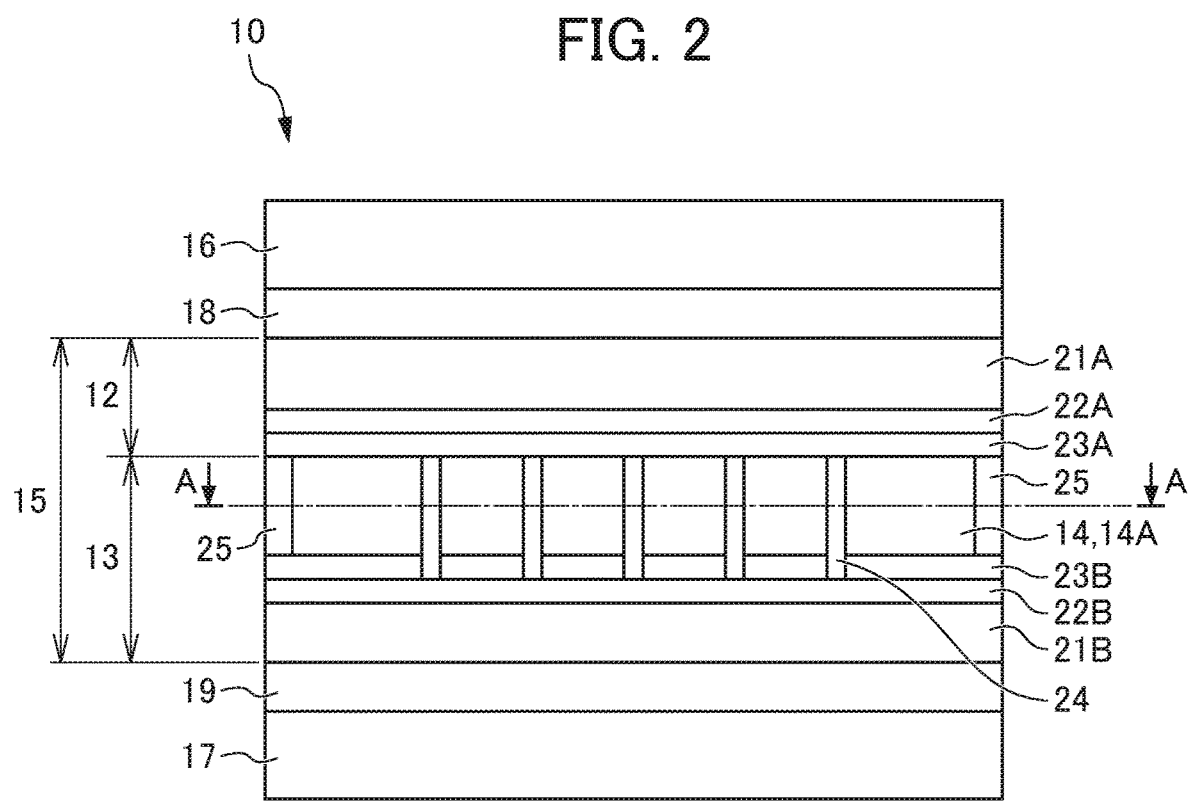

FIG. 5

| | | COMPARATIVE EXAMPLE 1 | EXAMPLE 1 | EXAMPLE 2 | EXAMPLE 3 | EXAMPLE 4 | EXAMPLE 5 | COMPARATIVE EXAMPLE 2 |
|---|---|---|---|---|---|---|---|---|
| SPACER SHAPE | SPACER DIAMETER [μm] | 7 | 9 | 27 | 28 | 35 | 39 | 48 |
| | SPACER PITCH [μm] | 110 | 110 | 230 | 110 | 110 | 110 | 110 |
| | SPACER OCCUPANCY [%] | 0.3 | 0.5 | 1 | 5 | 8 | 10 | 15 |
| | SPACER CRUSHING | × | ○ | ○ | ○ | ○ | ○ | ○ |
| | PENETRATION AND BASE MATERIAL DEFORMATION | × | ○ | ○ | ○ | ○ | ○ | ○ |
| | BENDING (NON-UNIFORM THICKNESS) | × | ○ | ○ | ○ | ○ | ○ | ○ |
| LIQUID CRYSTAL CELL PROPERTIES | TRANSPARENCY | ○ | ○ | ○ | ○ | ○ | △ | × |
| | TRANSMITTED LIGHT DIFFRACTION | ○ | ○ | ○ | ○ | ○ | △ | × |
| | LIQUID CRYSTAL ALIGNMENT | ○ | ○ | ○ | ○ | ○ | ○ | × |
| | LIQUID CRYSTAL DRIVEABILITY | × | ○ | ○ | ○ | ○ | ○ | ○ |
| | EXTERNAL APPEARANCE | × | ○ | ○ | ○ | ○ | ○ | × |
| OVERALL EVALUATION | | × | ○ | ○ | ○ | ○ | ○ | × |

LIGHT TRANSMISSION CONTROL FILM AND LAMINATED GLASS

TECHNICAL FIELD

The present invention relates to a light control film that can be used in, for example, an electronic blind controlling the transmission of extraneous light by being bonded to a window or the like, and laminated glass in which the light control film is used.

BACKGROUND ART

In the related art, various ideas have been proposed regarding a light control film that can be used in, for example, an electronic blind controlling the transmission of extraneous light by being bonded to a window or the like (Patent Documents 1 and 2). Such light control films include a light control film using liquid crystals. The light control film using liquid crystals is produced by sandwiching a liquid crystal cell with linear polarizing plates, the liquid crystal cell being produced by sandwiching a liquid crystal material with transparent plate materials in which transparent electrodes are produced. Accordingly, this light control film performs blocking or transmission of extraneous light by changing the alignment of the liquid crystals through a change in an electric field applied to the liquid crystals, and changes an amount of the transmitted light, so that the transmission of extraneous light is controlled.

The light control film is configured such that a spacer is provided in the transparent plate materials constituting the liquid crystal cell and the thickness of the liquid crystal layer is kept constant by the spacer. In addition, alignment layers are produced from thin films such as polyimide to which rubbing treatment is applied after the spacer is produced, and the alignment of the liquid crystals is regulated by the alignment layers.

It is conceivable that the light control film is used as an intermediate material of laminated glass or the like. When the light control film is used as the intermediate material of the laminated glass as described above, the pressing force at a time when the intermediate material is sandwiched and integrated with glass plates causes the electrodes to be short-circuited between the transparent plate materials constituting the liquid crystal cell or the gap (cell gap) between the transparent plate materials to become non-uniform. Accordingly, problems arise in the form of unstable driving and a reduction in quality of external appearance. The light control film is used when being bonded to a pane of glass or the like as well as in the laminated glass as described above. The same problems arise in this case depending on the conditions of use as in the case described above.

It may be conceivable to use a thicker spacer or increase the number of spacers as a method for solving the problems. This method, however, may result in problems in the form of a reduction in transmittance, a deterioration in liquid crystal alignment, and causing the diffracted light due to the spacer to be visually recognized.

Patent Document 1: Japanese Unexamined Patent Application, Publication No. H03-47392

Patent Document 2: Japanese Unexamined Patent Application, Publication No. H08-184273

DISCLOSURE OF THE INVENTION

Problems to be Solved by the Invention

The present invention has been made in view of the above-described circumstances. When a light control film is used as an intermediate material of laminated glass and the like, an object of the invention is to, for example, effectively avoid a reduction in quality of external appearance to perform stable driving sufficiently, and also prevent diffracted light from being visually recognized by effectively avoiding a reduction in transmittance and a deterioration in liquid crystal alignment.

Means for Solving the Problems

The inventors of the present invention have intensively studied to solve the above-mentioned problems and the like and completed the present invention by reaching an idea to optimize the area of a spacer per unit area.

Specifically, the followings are provided in the present invention.

(1) A light control film including a first laminate in which an alignment layer is provided, a second laminate in which an alignment layer is provided, a liquid crystal layer which is sandwiched between the first laminate and the second laminate and contains liquid crystal molecules, a spacer which is disposed in the liquid crystal layer to hold a thickness of the liquid crystal layer, and electrodes provided in the first laminate and/or the second laminate, in which the light control film controls transmitted light by controlling alignment of the liquid crystal molecules through driving performed by the electrodes and a proportion of an area occupied by the spacer per unit area in a light controllable-region of the liquid crystal layer is 0.1% to 10% inclusive, when the light control film is seen in a front view.

(2) The light control film according to (1), in which the spacer is a spacer formed of photoresist resin and the proportion of the occupied area is 0.5% to 10% inclusive.

(3) The light control film according to (1), in which the spacer is a bead spacer.

(4) The light control film according to (3), in which a number of spacers disposed in a range with a radius of 200 μm is one or more.

(5) The light control film according to any one of (1) to (4), in which the liquid crystal layer is a guest-host type liquid crystal layer containing a dichroic dye.

(6) Laminated glass in which the light control film according to any one of (1) to (5) is sandwiched by sheets of plate glass.

Effects of the Invention

When the light control film using the liquid crystals is used as an intermediate material of laminated glass and the like, it is possible for the present invention to, for example, effectively avoid a reduction in quality of external appearance to perform sufficiently stable driving, and prevent diffracted light from being visually recognized by effectively avoiding a reduction in transmittance and a deterioration in liquid crystal alignment.

BRIEF DESCRIPTION OF THE DRAWINGS

FIG. 2 is a diagram illustrating a light control film used in the laminated glass illustrated in FIG. 1;

FIG. 5 is a chart showing the light control film illustrated in FIG. 2;

PREFERRED MODE FOR CARRYING OUT THE INVENTION

First Embodiment

[Laminated Glass]

Figure 1:
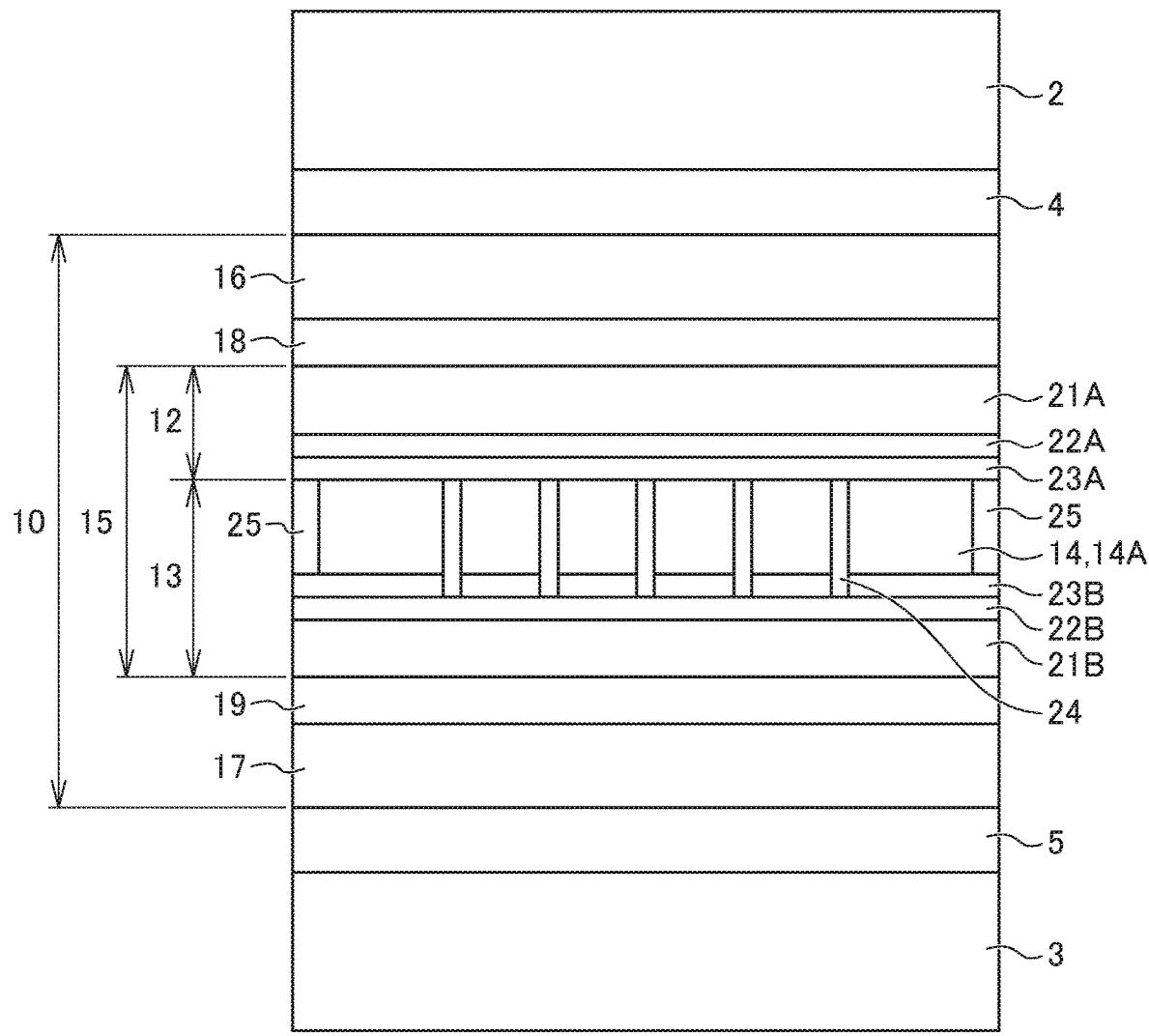
FIG. 1 is a diagram illustrating laminated glass according to a first embodiment of the present invention.

FIG. 1 is a sectional view illustrating laminated glass according to a first embodiment of the present invention. This laminated glass 1 is applied to a vehicle window or the like and includes a light control film 10 which is sandwiched by plate glass 2 and plate glass 3 via an intermediate layer 4 and an intermediate layer 5, respectively. Various materials applicable to this type of laminated glass can be widely applied to the plate glass 2 and the plate glass 3. The intermediate layers 4 and 5 functions as adhesive layers between the light control film 10 and the plate glass 2 and 3. Various elements applied to this type of laminated glass can be widely applied to the intermediate layers 4 and 5, and the intermediate layers 4 and 5 may function as, for example, heat ray shielding materials.

The plate glass 2 is laminated with the light control film 10 via the intermediate layer 4, and the plate glass 3 is laminated with the light control film 10 via the intermediate layer 5, respectively. Subsequently, the laminated glass 1 is heated and pressurized such that the plate glass 2 and 3 are integrated with the light control film 10 via the intermediate layers 4 and 5, and given a desired curved surface shape as a whole. Accordingly, the laminated glass 1 is applicable to a rear window of a vehicle or the like, and is configured to control transmitted light by the light control film 10. In this connection, processes for manufacturing the laminated glass 1 include a lamination process in which the light control film 10 is laminated with the plate glass 2 provided with the intermediate layer 4 and the plate glass 3 provided with the intermediate layer 5 and a heating, and pressurization and heating process in which the laminate resulting from the lamination process is heated and pressurized.

[Light Control Film]

FIG. 2 is a sectional view illustrating the light control film. This light control film 10 is formed in a film shape and is used for a light-controlling part, for example, as well as for laminated glass. Usage cases where the light control film 10 is bonded to the light controlling part include, for example, a case where switching between transparency and opacity is performed with the light control film 10 disposed on window glass of a building, a showcase, a transparent indoor partition, and the like.

This light control film 10 is a light control film controlling transmitted light by using liquid crystals. A liquid crystal cell 15 is produced by a liquid crystal layer 14 being sandwiched by a lower laminate 13 (first laminate) and an upper laminate 12 (second laminate) that are film-shaped first and second laminates. And the light control film 10 is produced by the liquid crystal cell 15 being sandwiched by linear polarizers 16 and 17.

Although a twisted nematic (TN) method is applied for driving of the liquid crystal layer 14 in this embodiment, various methods are applicable such as a vertical alignment (VA) method and an in-place-switching (IPS) method. In the light control film 10, the lower laminate 13 and/or the upper laminate 12 is provided with spacers 24 so that a thickness of the liquid crystal layer 14 is maintained constant. The linear polarizers 16 and 17 are provided with retardation films 18 and 19 for optical compensation, each of which is provided on a liquid crystal cell 15 side, respectively. The laminates 12 and 13 are formed by sequential creation of electrodes 22A and 22B and alignment layers 23A and 23B on base materials 21A and 21B, respectively. The retardation films 18 and 19 may be omitted if unnecessary.

Figure 3A:
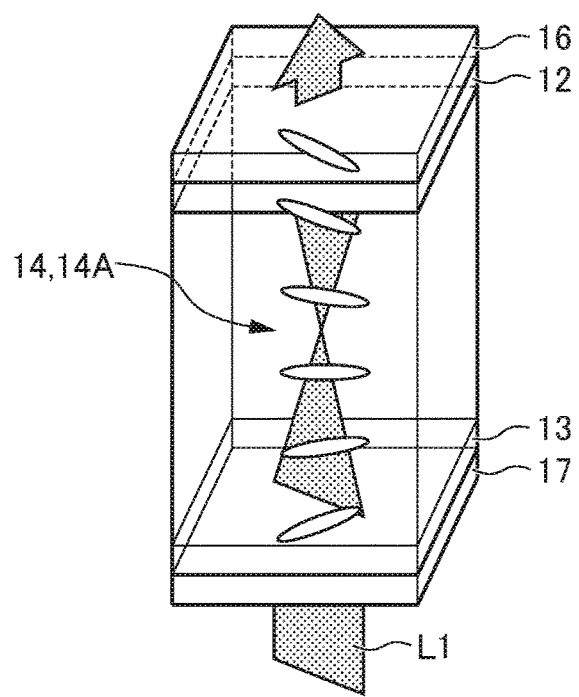
FIGS. 3A and 3B are each a diagram showing an operation of the light control film illustrated in FIG. 2.
Figure 3B:
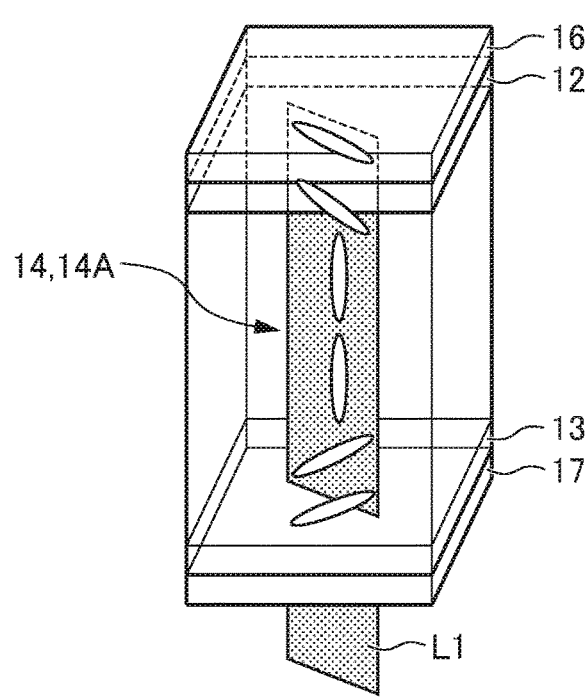

This light control film 10 is configured to switch between a transparent state and a non-transparent state, by changing voltages applied to the electrodes 22A and 22B such that the transmission of extraneous light L1 is controlled as illustrated in FIGS. 3A and 3B. FIG. 3A illustrates a state where no voltage is applied between the electrodes 22A and 22B. FIG. 3(B) illustrates a state where a voltage is applied to the electrodes 22A and 22B. In this manner, the liquid crystal layer 14 is driven by so-called normally white in this embodiment. The liquid crystal layer 14 may alternatively be driven by normally black. In addition, it is a matter of course that the electrodes 22A and 22B are produced together on an alignment layer 23A side or an alignment layer 23B side and the laminates 12 and 13 (described later) are configured accordingly when the IPS method is applied.

When, for example, the light control film 10 is used after being bonded to the window glass of a building, a showcase, a transparent indoor partition, and the like, a protective layer of a hard coat layer or the like is provided on a surface of the linear polarizer 16 and/or 17 that is on a side opposite to the liquid crystal cell 15.

Various flexible and transparent film materials applicable to the liquid crystal cell 15 can be adopted as the base materials 21A and 21B, and a polycarbonate-based film material on both surfaces of which are provided with hard coat layer is applied in this embodiment. Various elements perceived as transparent are applicable to the electrodes 22A and 22B which are capable of applying a substantially uniform electric field to the liquid crystal layer 14. In this embodiment, the electrodes 22A and 22B are formed in such a manner that the entire surfaces of the base materials 21A and 21B are covered respectively with a transparent conductive film made of an ITO of a transparent electrode material. As described above, in case of the IPS method or the like, the electrodes are produced through patterning in a desired shape.

Various material layers applicable to alignment layers such as polyimide are adopted as the alignment layers 23A and 23B. The alignment layers 23A and 23B are formed in such a manner that a finely lined uneven shape is produced in surfaces of the material layers through rubbing treatment with a rubbing roll. It may be appropriate that the alignment layers through the rubbing treatment—described above may be replaced with alignment layers which are produced in such an alternative manner that the finely lined uneven shape produced by the rubbing treatment is produced instead by shaping treatment or by means of a photo-alignment layer.

A spacer 24 according to this embodiment is produced of photoresist material although various resin materials are widely applicable.

A sealant 25, which is disposed to surround the liquid crystal layer 14 in the liquid crystal cell 15, prevents liquid crystal leakage.

[Manufacturing Process]

Figure 4:
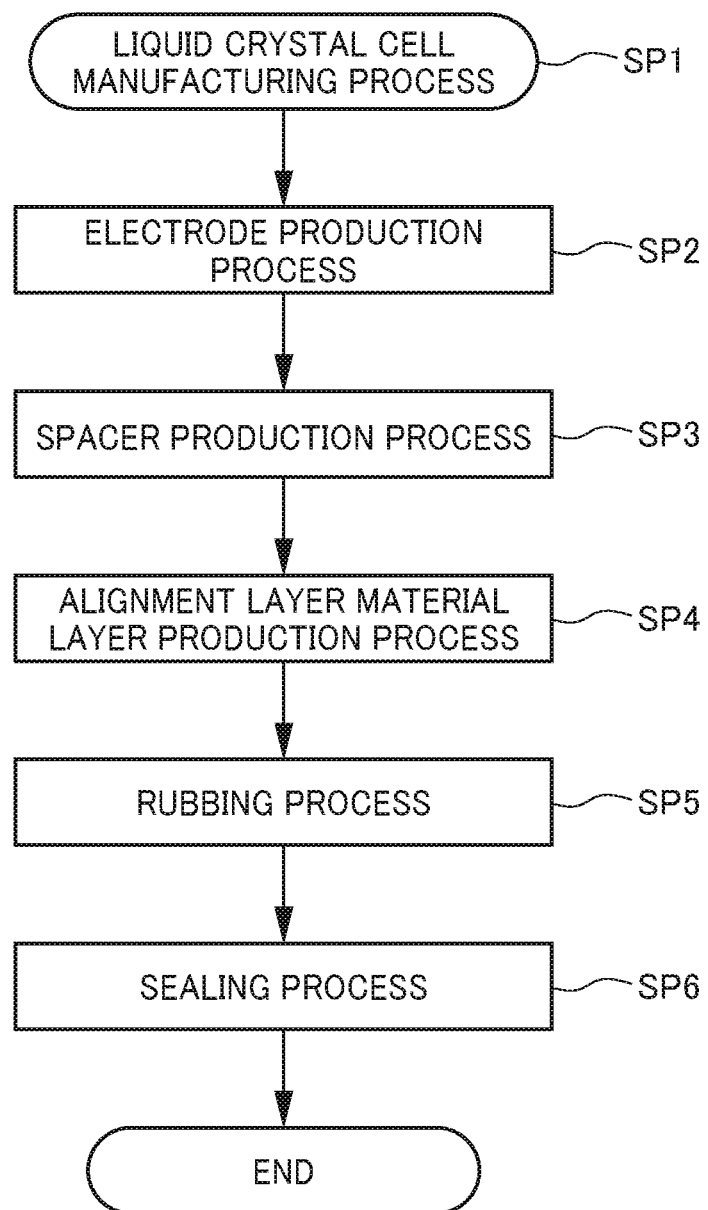
FIG. 4 is a flowchart illustrating a process for manufacturing the light control film illustrated in FIG. 2.

FIG. 4 is a flowchart illustrating a process for manufacturing the liquid crystal cell 15. In an electrode production process SP2, the ITO-based transparent electrodes 22A and 22B are produced on the base materials 21A and 21B of the liquid crystal cell 15. Subsequently, in a spacer production process SP3, a coating liquid (photoresist) pertaining to the spacer 24 is applied, and then the spacer 24 is produced through drying, exposure, and development. When the spacer 24 is produced in only one of the laminates 12 and 13, the spacer production process SP3 is omitted for the base material in which the spacer 24 is not produced.

Next, in an alignment layer material layer production process SP4 for the liquid crystal cell 15, the material layers of the alignment layers 23A and 23B are formed by a coating liquid pertaining to the alignment layers 23A and 23B being applied, dried, and cured. Next, in a rubbing process SP5 for the liquid crystal cell 15, a finely lined uneven shape is produced in the surfaces of the alignment layer material layers through rubbing roll-based rubbing treatment and the alignment layers 23A and 23B are produced as a result.

Next, in a sealing process SP6 for the liquid crystal cell 15, the sealant 25 shaped to surround the liquid crystal layer 14 is provided for one of the laminates 12 and 13, and a liquid crystal material is disposed in the place that is surrounded by the sealant 25. In this process, lamination is performed by the other one of the laminates 12 and 13 being brought in this state such that the liquid crystal material is sandwiched by the laminates 12 and 13, the sealant is cured by ultraviolet irradiation or the like with pressurization performed in this state, and the liquid crystal cell 15 is produced accordingly.

The liquid crystal cell 15 is provided in the form of a long film in which the base materials 21A and 21B are wound around a roll, and some or all of the processes SP2 to SP6 are executed while the base materials 21A and 21B are unwound from the roll and transported. As a result, each process for the liquid crystal cell 15 is executed by processing per a sheet from midway of processes if necessary.

[Detailed Configuration of Spacer]

Figure 6:
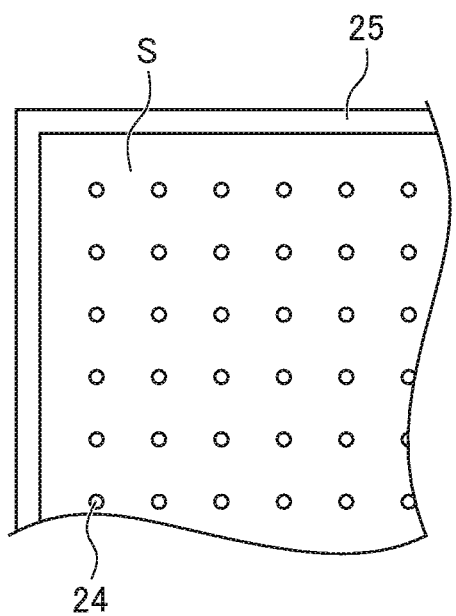
FIG. 6 is a diagram illustrating a part of the cross section taken along line A-A of FIG. 2.

FIG. 5 is a chart showing the configuration of the spacer 24 in detail. FIG. 6 is a diagram illustrating a part of the cross section taken along line A-A of FIG. 2. As illustrated in FIG. 6, the spacers 24 are disposed in an internal region that is surrounded by the sealant 25. The internal region is a light control region S contributing to light control of the light control film 1.

Each spacer 24 has a circular cross section resulting from a columnar shape, more specifically a cylindrical shape or a truncated cone shape.

The spacers 24 are disposed such that the proportion of an area occupied by the spacers 24 per unit area in the light control region S when the light control film 10 is viewed from the front (proportion of the projected area of the spacers 24 when viewed from one surface of the light control film 10, hereinafter, appropriately referred to as the occupancy of the spacer) is 0.5% to 10% inclusive and more preferably 0.5% to 8% inclusive.

When the light control film 10 is used as an intermediate material of the laminated glass 1, the spacers 24 may be deformed due to the pressurization and heating in the heating and pressurization process among processes for manufacturing the laminated glass 1. When a deformation of the spacer 24 is large, the electrodes 22A and 22B of the laminates 12 and 13 may be short-circuited to be inoperable, or may operate unstably in the light control film 10. In addition, a thickness (cell gap) of the liquid crystal layer 14 locally decreases and becomes non-uniform, resulting in a reduction in quality of external appearance.

According to the results of various studies, the pressure acting on each spacer increases to cause the spacer 24 to crush, a tip of the spacer 24 to penetrate a facing surface to cause the electrode to be short-circuited, and the base material to bend between the spacers 24 to result in the non-uniformity of the cell gap, such that the operation of the light control film becomes unstable and the quality of external appearance decreases accordingly, when the occupancy of the spacer is less than 0.5%.

When the occupancy of the spacer is 0.5% or more, in contrast, the short circuit of the electrodes 22A and 22B and the local cell gap reduction attributable to the deformation of the spacer 24 can be prevented and a reduction in the quality of external appearance can be prevented based on a stable operation as a result.

When the occupancy of the spacer exceeds 10% or 8% more strictly, the density of the spacers 24 excessively increases and the spacers 24 cause various problems.

When the occupancy of the spacer exceeds 10% or more strictly 8%, an area that is shadowed by a spacer 24 and not subjected to normal rubbing mark production during the rubbing treatment increases, and a deterioration in liquid crystal alignment arises accordingly.

As no liquid crystal is disposed where the spacers 24 are provided, parts of the light control film 10 where the spacers 24 are provided block transmitted light by the optical properties of the laminate of the linear polarizers 16 and 17 based on cross-Nicol arrangement.

When the occupancy of the spacers increases, the effect of the blocking of transmitted light by the spacer 24 is noticeably perceived and a reduction in transparency arises as a result. In addition, diffracted light increases when the occupancy of the spacers increases, and the diffracted light is visually recognized as a light spot or the like.

FIG. 5 is a chart specifically illustrating the results of experiments regarding the occupancy of the spacers. In FIG. 5, "×" indicates that a measurement result not suitable for practical use was obtained in every sample, "Δ" indicates that a measurement result not suitable for practical use was obtained in some of a plurality of samples, and "○" indicates that a sufficiently practical measurement result was obtained in each of the samples.

In the experiments related to FIG. 5, weight corresponding to 0.8 MPa was applied to the light control film for 24 hours in a state where the light control film was placed on a smooth and highly hard surface of a surface plate. Subsequently, cell gaps were observed to know bending of the base material between the spacers and cell gap non-uniformity (bending, non-uniform thickness).

After the weight application, the upper laminate and the lower laminate were peeled off and crushing of the spacers (spacer crushing) was confirmed through microscopic spacer observation. In addition, spacer tip penetration at a spacer-abutting part and deformation (film penetration and base material deformation) of the base material were observed through microscopic observation of the spacer-abutting part.

In addition, transmitted light was observed to know a reduction in transmittance (transparency), the degree of diffracted light (transmitted light diffraction), and liquid crystal alignment. In addition, the voltage applied to the electrode was switched to perform switching between a transmission state and a light blocking state, so that the drivability of liquid crystals (liquid crystal drivability) was observed. Furthermore, the external appearance was observed.

In Comparative Example 1 in FIG. 5, spacers each having a diameter of 7 μm and a height of 6 μm were produced and disposed at equal pitches of 110 μm in two orthogonal directions. In Comparative Example 1, a spacer with a diameter of 7 μm was disposed within an area of 110×110 μm². In this manner, a light control film was produced with a liquid crystal cell produced at spacer occupancy of 0.3%.

In Comparative Example 1, crushing of the spacer occurred (spacer crushing). In addition, a region where the tip of a spacer 24 penetrated the facing surface was found partially (penetration and base material deformation) and a region with a non-uniform cell gap resulting from base material bending between spacers 24 was confirmed partially (bending, non-uniform thickness).

In Comparative Example 1, however, a reduction in transmittance attributable to the spacer 24 was negligibly small and an amount of the diffracted light in the transmitted light was also small as a result of the 0.3% spacer occupancy. In addition, it was found that local liquid crystal misalignment was almost negligible. However, the region with a non-uniform cell gap resulting from base material bending between the spacers 24 still existed. Accordingly, a problem in terms of liquid crystal drivability remained since it was difficult to set an entire surface uniformly in a light blocking state and a translucent state through driving a liquid crystal layer 14. A poor appearance was also confirmed. As an overall evaluation, it has been found that this Comparative Example 1 is not suitable for practical use.

In Example 1, spacers 24 each having a diameter of 9 μm and a height of 6 μm were disposed at a pitch of 110 μm with spacer occupancy of 0.5%. In Example 2, spacers 24 each having a diameter of 27 μm and a height of 6 μm were disposed at a pitch of 230 μm with spacer occupancy of 1%. In Example 3, spacers 24 each having a diameter of 28 μm and a height of 6 μm were disposed at a pitch of 110 μm with spacer occupancy of 5%. In Example 4, spacers 24 each having a diameter of 35 μm and a height of 6 μm were disposed at a pitch of 110 μm with spacer occupancy of 8%. In Example 5, spacers 24 with a diameter of 39 μm and a height of 6 μm were disposed at a pitch of 110 μm with spacer occupancy of 10%.

In each of Examples 1 to 5, spacer crushing was not observed, a region where the tip of a spacer 24 penetrated the facing surface was not found, and a region with a non-uniform cell gap was not confirmed.

It also was found that a reduction in transmittance attributable to the spacer 24 was negligibly small, an amount of the diffracted light in the transmitted light was small, and local liquid crystal misalignment was almost negligible.

Also confirmed were that the entire surface could be uniformly set in a light blocking state and a translucent state through driving the liquid crystal layer 14, that the liquid crystal drivability was sufficient, and that no problem arose in terms of external appearance. As an overall evaluation, it was found that Examples 1 to 5 were sufficiently practical.

In Comparative Example 2, on the other hand, spacers 24 each having a diameter of 48 μm and a height of 6 μm were disposed at a pitch of 110 μm with spacer occupancy of 15%. In Comparative Example 2, spacer crushing was not observed, a region where the tip of a spacer 24 penetrated the facing surface was not found, and a region with a non-uniform cell gap was not confirmed.

However, a reduction in transmittance attributable to the spacer 24 was not negligible, an amount of the diffracted light in the transmitted light was not negligible, and local liquid crystal misalignment was not negligible.

On the other hand, it was confirmed that an entire surface could be uniformly set in a light blocking state and a translucent state through driving a liquid crystal layer 14 and that the liquid crystal drivability was sufficient, since the cell gap could be stably held.

However, it was determined that the appearance was poor since the diffracted light or the like was not negligible. Accordingly, it was found as an overall evaluation that this Comparative Example 2 was not suitable for practical use.

The spacer 24 is given a height corresponding to the thickness required of the liquid crystal layer 14 depending on the liquid crystal material used for the liquid crystal layer 14. More specifically, the height of the spacer 24 is 2 to 10 μm inclusive. As a result, the light control film 10 and the laminated glass 1 can be driven in a sufficiently stable manner without a reduction in quality of external appearance. In addition, it is possible to avoid effectively a reduction in transparency and a deterioration in liquid crystal alignment, such that diffracted light is not visually recognized.

The spacers 24 are randomly disposed in some cases. In such cases, the occupancy of the spacers is obtained by calculation of the area of a part where the spacers 24 are disposed in a region with a sufficiently large area. That is, the occupancy of the spacers is obtained by a summation of sectional areas of the spacers 24 disposed at the part in a plan view (front view).

In the embodiment, the spacer 24 is formed in a substantially circular shape (with an ellipticity of at least 0.9) in a front view in which the tip is a flat surface. When the spacer 24 has a substantially circular shape as described above, a change in the size of the part that creates the shadow in the rubbing treatment can be reduced with respect to any rubbing treatment direction. Accordingly, various products with different rubbing directions can be stably produced.

When the spacer 24 is formed in the substantially circular shape in the front view in which the tip is a flat surface as described above, it is possible to reduce stress concentration at the tip of the spacer 24. Accordingly, it is possible to avoid a phenomenon in which the tip of the spacer 24 pierces a facing alignment layer and cell gap non-uniformity attributable to crushing of the spacer 24 occurs during liquid crystal cell production.

When the spacer 24 is produced with an ellipticity of at least 0.9, local stress concentration can be sufficiently mitigated and a reduction in quality of external appearance and the like can be avoided even more effectively, by producing the spacer 24 in such a manner that a diameter of at least 9 μm on the minor axis side and the above-described occupancy are satisfied.

Although it may be preferable that an occupancy of 0.5 to 10% is satisfied as a whole, it may be that any area of 1 mm² in the light control region S satisfies 0.5 to 10% range. For example, it may be preferable that an area of 1 mm² within an easily stressed part at least satisfies the occupancy of 0.5 to 10%. Other parts having less than this occupancy may be present in a place where stress is relatively less likely to act.

From the viewpoint of quantity, the number of the spacers 24 disposed within a range with a radius of 200 μm in the light control region S is 2 to 30 inclusive and more preferably 2 to 10 inclusive.

When the number of the spacers 24 within the range with the radius of 200 μm in the light control region S is less than two (is 1 or 0), the pressure acting on each spacer increases similarly with the above-described case where the occupancy of the spacer 24 is less than 0.5%. Accordingly, the spacer 24 is crushed or the tip of the spacer 24 penetrates a facing surface to cause the electrode to be short-circuited. In addition, the cell gap becomes non-uniform due to the base material being bent between the spacers 24, the operation of the light control film becomes unstable and the quality of external appearance decreases.

When the number of the spacers 24 within the range with the radius of 200 μm is two or more, however, the short circuit of the electrodes 22A and 22B and the local cell gap reduction attributable to the deformation of the spacer 24 can be prevented and the reduction in the quality of external appearance can be prevented based on a stable operation as a result.

When the number of the spacers 24 within the range with the radius of 200 μm exceeds 30, on the other hand, problems as described below may arise similarly with a case where the occupancy of the spacer exceeds 10%. In the present embodiment, the problems below may not arise since the number is 30 or less.

For example, the area of the part, which is subjected to the shadow of the spacer 24 during the rubbing treatment, so that normal rubbing mark production is obstructed, increases, and liquid crystal alignment decreases accordingly.

In addition, since the parts where the spacers 24 are provided are not provided with any liquid crystal, transmitted light is blocked by the optical properties of the laminate of the linear polarizers 16 and 17 based on cross-Nicol arrangement. Accordingly, when the occupancy of the spacer increases, the effect of the blocking of transmitted light by the spacer 24 is noticeably perceived, resulting in a reduction in transparency. In addition, when the occupancy of the spacer increases, diffracted light increases and the diffracted light is visually recognized via a light spot or the like.

Second Embodiment

Figure 7:
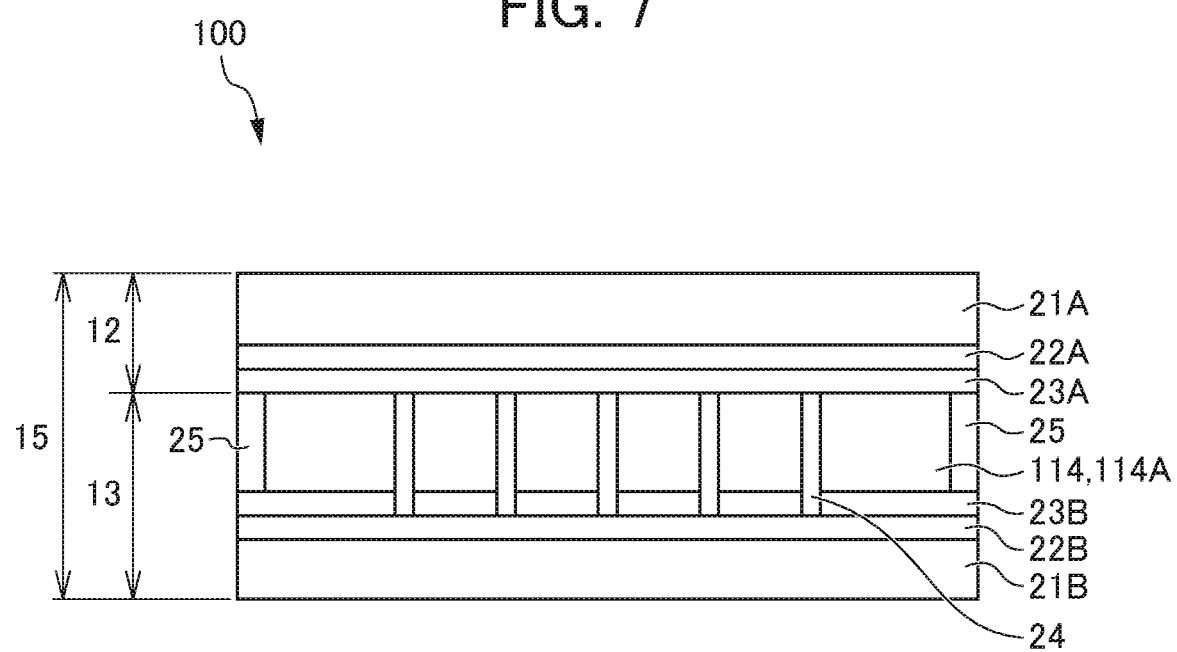
FIG. 7 is a sectional view illustrating a light control film according to a second embodiment.

FIG. 7 is a sectional view illustrating a light control film 100 according to a second embodiment. The second embodiment differs from the first embodiment in that a liquid crystal layer 114 according to the second embodiment is a guest-host method one in which dichroic dyes are mixed with guest-host type liquid crystal molecules 114A.

Linear polarizers can be omitted from the second embodiment. The guest-host method is a method by which dichroic dyes 114B are mixed in the guest-host type liquid crystal molecules 114A. Light transmission and blocking are controlled by the dichroic dyes 114B which moves along with a movement of the guest-host type liquid crystal molecules 114A.

FIG. 7 is identical to FIG. 2 except that no linear polarizer is provided, and thus the same reference numerals will be used to refer to members common to FIGS. 2 and 7 so that the same description is not repeated.

Figure 8:
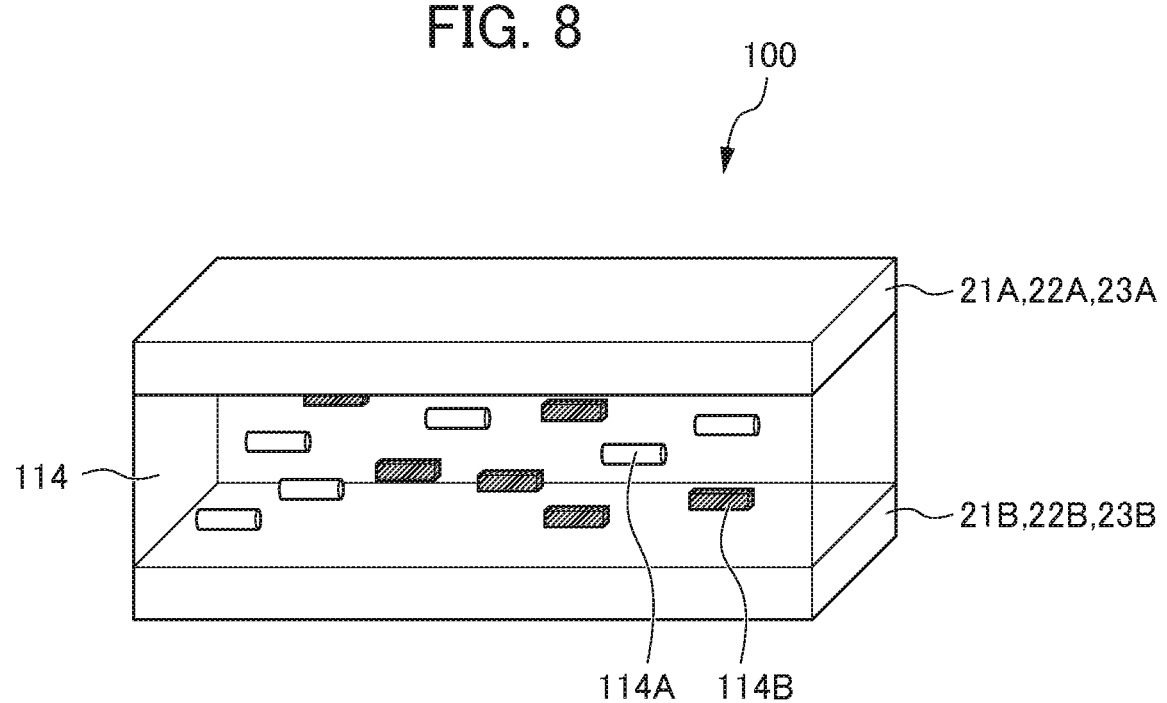
FIG. 8 is a diagram showing directions of guest-host type liquid crystals and dichroic dyes in a guest type liquid crystal layer.
Figure 9:
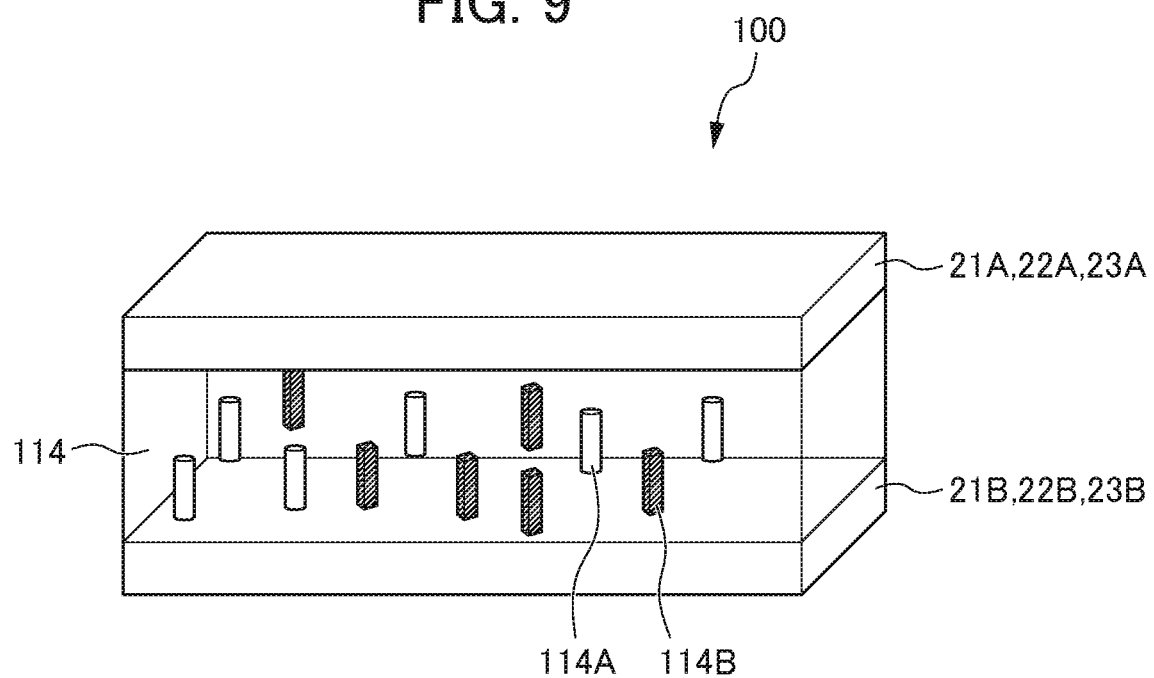
FIG. 9 is a diagram showing directions of guest-host type liquid crystals and dichroic dyes in a guest type liquid crystal layer.

FIGS. 8 and 9 are diagrams showing directions of the guest-host type liquid crystal molecules 114A and the dichroic dyes 114B in the guest-host method liquid crystal layer 114. When the guest-host method light control film 100 blocks light, the guest-host type liquid crystal molecules 114A and the dichroic dyes 114B are horizontally aligned in one direction as illustrated in FIG. 8. In other words, production is performed such that the longitudinal directions of the liquid crystal composition and the dichroic dyes 114B are the same horizontal direction. When transmitting light, the guest-host liquid crystals and the dichroic dyes 114B are vertically aligned as illustrated in FIG. 9. In other words, longitudinal directions of a liquid crystal composition and the dichroic dyes 114B become a thickness direction of the liquid crystal layer 114.

Also in the present embodiment, a spacer 24 is disposed such that an occupancy per unit area in a light control region S when the light control film 100 is seen in a front view is 0.5% to 10% inclusive and more, preferably 0.5% to 8% inclusive.

Accordingly, the occupancy of the spacer is 0.5% or more, and thus the short circuit of electrodes 22A and 22B and a local cell gap reduction attributable to the deformation of the spacer 24 can be prevented, and a reduction in quality of external appearance can be prevented as a result of a stable operation similarly with the first embodiment.

In addition, as the occupancy of the spacer is 10% or less and more preferably 8% or less, various problems attributable to the spacer 24 owing to an excessive increase in the density of the spacer 24 do not arise. Furthermore, a decrease in alignment of liquid crystal does not occur, following an increase in the area of a part over which the spacer 24 casts a shadow and which obstructs normal rubbing mark production during the rubbing treatment.

In addition, in the guest-host method light control film 100, a change in transmittance and a change in color with respect to gap fluctuation are smaller than in the light control film according to the first embodiment. Accordingly, a difference in transmittance and color unevenness are unlikely to be witnessed even when the gap (thickness of the liquid crystal layer 114) changes as a result of slight bending of the base material.

The number of the spacers 24 disposed within the range with the radius of 200 μm in the light control region is 2 to 30 inclusive and preferably 2 to 10 inclusive in the first embodiment. In the light control film 100 according to the second embodiment, however, the effect that a difference in transmittance and color unevenness are unlikely to be witnessed even when the gap (thickness of the liquid crystal layer 114) changes as a result of slight bending of the base material can be achieved with the number of spacers 24 within a range with a radius of 200 μm being 1 to 30 inclusive and preferably 1 to 10 inclusive.

Third Embodiment

Figure 10:
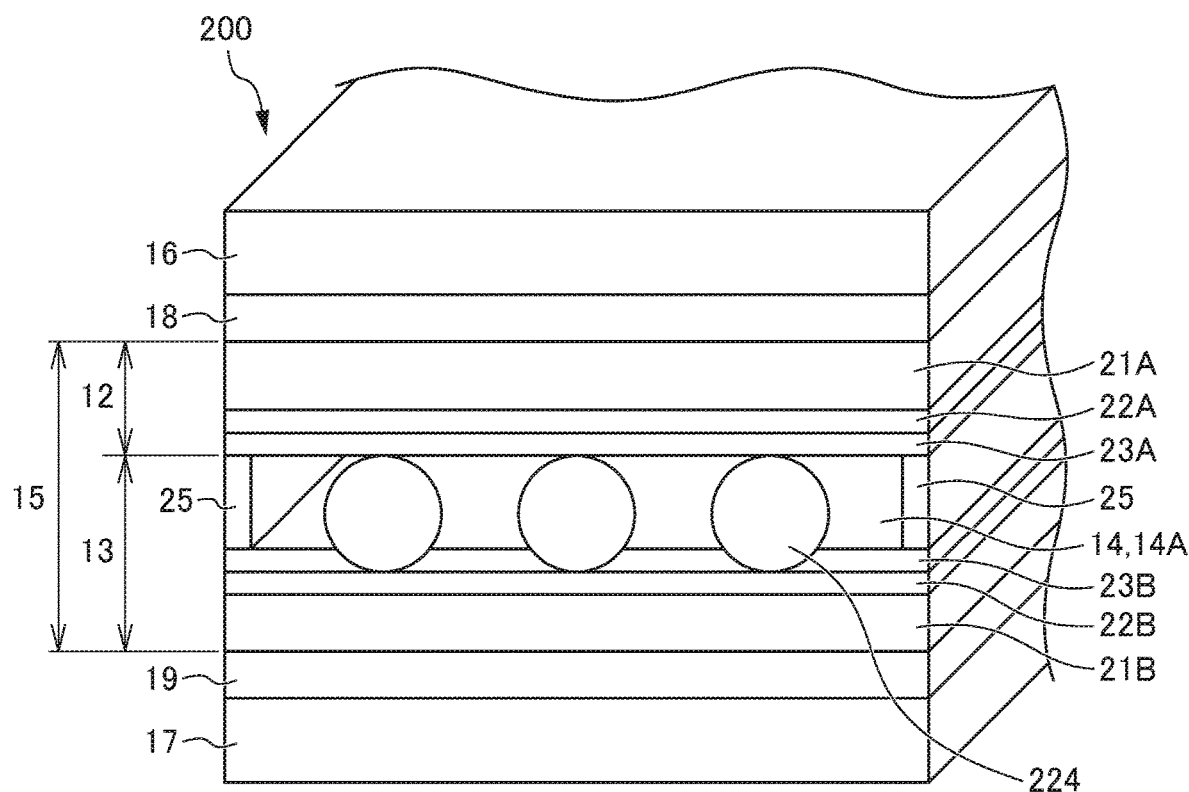
FIG. 10 is a sectional perspective view illustrating a light control film according to a third embodiment.

FIG. 10 is a sectional perspective view illustrating a light control film 200 according to a third embodiment. In the third embodiment, a so-called bead spacers 224 are used as spacers. A bead spacer 224 according to the present embodiment has a spherical shape, and the diameter thereof is 1 μm to 20 μm and preferably ranges from 3 μm to 15 μm. The same reference numerals will be used to refer to members common to FIGS. 2 and 10 so that the same description is not repeated.

The bead spacer 224 is provided to control a thickness of a liquid crystal layer 14 similarly with the spacer 24 according to the first embodiment. A composition based on an inorganic material formed of silica or the like, an organic material-based composition, a composition using a core-shell structure in which those are combined and the like can be widely applied to the bead spacer 224.

Although the bead spacer 224 according to the present embodiment has a spherical shape, alternative configurations may include a rod shape such as a cylindrical shape and a prismatic shape. The bead spacer 224 may be disposed anywhere between electrodes 22A and 22B. Although the bead spacer 224 is produced with a transparent member, colored material application and color adjustment may be also possible if necessary.

Various arrangement methods in addition to wet/dry spraying can be widely applied to the bead spacer 224. The bead spacers 224 according to this embodiment are randomly disposed on the electrode 22B and held in an almost immovable manner by a coating liquid resulting from dispersion of the bead spacers 224 and a resin component in a solvent being partially applied and then drying and baking being sequentially executed.

A lower limit of the occupancy of the bead spacers 224 may be smaller than in the first embodiment and the lower limit is 0.1% to 10% inclusive and more preferably 0.2% to 8% inclusive in the present embodiment. In an example of the present embodiment, 300 bead spacers are disposed in a unit area of 1 mm$^2$ (300 bead spacers/mm$^2$) with an occupancy of 0.32%.

The bead spacer 224 according to the present embodiment may have a lower occupancy than the photoresist-based spacer 24 according to the first embodiment. The reason for this is that the number of supporting points becomes relatively large even at the same occupancy as the spacer 24 in the case of the bead spacer 224 although the number of supporting points tends to decrease as the diameter of the cylindrical shape exceeds the liquid crystal cell gap in the case of the spacer 24, with respect to the designed liquid crystal cell gap (that is, the height of the spacer 24 in the case of the spacer 24 and the diameter of the bead spacer 224 in the case of the bead spacer 224).

Although it may be preferable that a range with an occupancy of 0.5% to 10% is satisfied as a whole similarly with the first embodiment, it may be acceptable if any range of 1 mm$^2$ in a light control region S satisfies this 0.5% to 10% range. For example, it may be preferable that the range of 1 mm$^2$ within an easily stressed part is at least 0.5% to 10%. Other parts less than this range may be present in a place where stress is relatively less likely to act.

Figure 11:
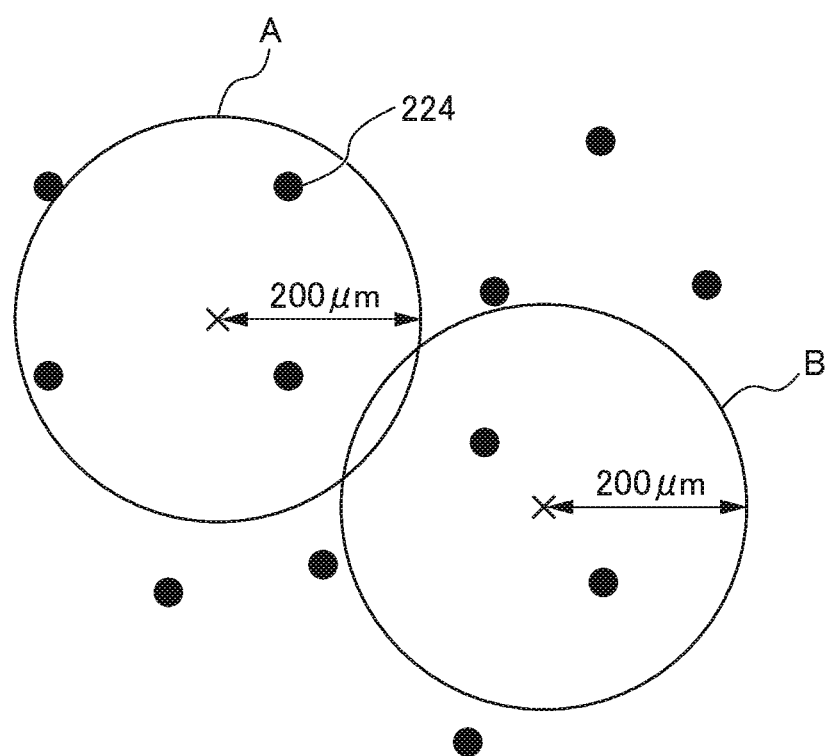
FIG. 11 is a diagram illustrating a dispersion state of bead spacers.

FIG. 11 is a diagram illustrating a dispersion state of the bead spacers 224. The bead spacers 224 according to the present embodiment are not regularly arranged because the bead spacers 224 are disposed by spraying not similarly with the case of the first embodiment in which drying, exposure, and development are performed after photoresist coating. The concentration and dispersion are adjusted in the present embodiment, such that the bead spacers 224 are arranged in such a manner as illustrated in FIG. 11 that at least one of the bead spacers 224 exists in any of regions A and B within a range of 200 μm from an arbitrary point located in a plane.

Figure 12:
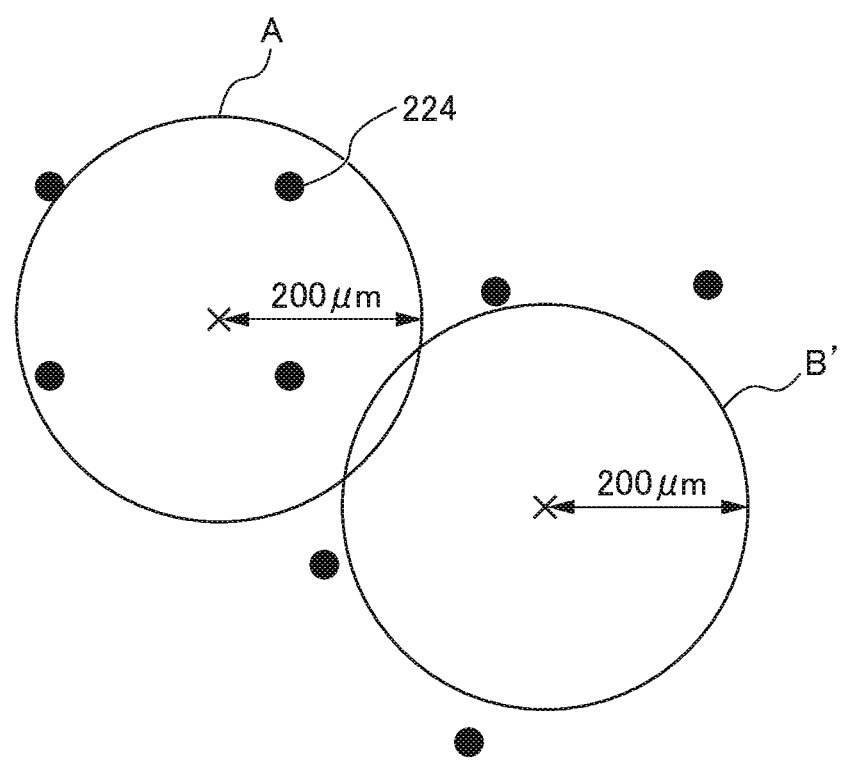
FIG. 12 is a diagram illustrating a dispersion state of bead spacers according to a comparative configuration.

FIG. 12 illustrates a comparative configuration in which a region B' exists where no spacer is present within a range of 200 μm from an arbitrary point in a plane. In this case, the gap (thickness of the liquid crystal layer) may not be maintainable at a part where the light control film is bent.

In the present embodiment, however, a region is not present where no spacer is present within the range of 200 μm from an arbitrary point in the plane, and thus the gap (thickness of the liquid crystal layer) can be maintained even at a part where the light control film 200 is bent.

The present embodiment has the effects as shown below in addition to the effects of the first embodiment. The bead spacer 224 is used, and a bead spacer 224 is disposed in a state where the central axis thereof is horizontal. Accordingly, contact portions between the bead spacer 224 and alignment layers 23A and 23B remain close to a straight line and liquid crystal molecules 14A are present in gaps between the alignment layers 23A and 23B and the bead spacer 224 in a thickness direction of a liquid crystal layer 14. Since the liquid crystal molecules 14A existing in the gaps also contribute to light control, a light control function is not impaired in an entire area occupied by the spacers 224 and a deterioration in the light control function can be reduced.

Furthermore, the area of contact between the bead spacer 224 and the base material (alignment layers 23A and 23B) increases as a force is applied in the thickness direction of the light control film 200, and a reactive force against a pressing force can be increased, accordingly. The liquid crystal cell according to the third embodiment also may include a guest-host method one similarly with the case of the second embodiment.

Other Embodiments

Although specific configurations suitable for implementation of the present invention have been described in detail above, the above-described embodiments of the present invention may be changed in various forms within the scope of the present invention.

Although the spacer according to the embodiments described above is made of a transparent photoresist resin, the present invention is not limited thereto. It may be alternatively possible to widely apply the present invention to cases where a spacer is produced by shaping treatment, integrally with or separately from an alignment layer, and by the use of resin provided for shaping of an ultraviolet-curable resin and the like.

EXPLANATION OF REFERENCE NUMERALS

1 Laminated glass
2, 3 Plate glass
4, 5 Intermediate layer
10, 100, 200 Light control film
12 Upper laminate
13 Lower laminate
14, 114 Liquid crystal layer
14A Liquid crystal molecule
15 Liquid crystal cell
16, 17 Linear polarizer
18, 19 Retardation film
21A, 21B Base material
22A, 22B Electrode
23A, 23B Alignment layer
24 Spacer
25 Sealant
114A Guest-host type liquid crystal molecule
114B Dichroic dye
224 Bead spacer

The invention claimed is:

1. A light control film comprising:
a first laminate in which an alignment layer is provided;
a second laminate in which an alignment layer is provided;

a liquid crystal layer which is sandwiched between the first laminate and the second laminate and contains liquid crystal molecules;

a plurality of bead spacers in a light controllable-region of the liquid crystal layer to hold a thickness of the liquid crystal layer; and electrodes provided in the first laminate and/or the second laminate, wherein the light control film controls transmitted light by controlling alignment of the liquid crystal molecules through driving performed by the electrodes, a proportion of an area occupied by the plurality of bead spacers per unit area in the light controllable-region of the liquid crystal layer is 0.1% to 10% inclusive, in a front view with respect to the light control film, every circular area with a radius of 200 μm and a center located in the light controllable-region of the liquid crystal layer includes at least one independent bead spacer of the plurality of bead spacers, the light controllable-region being a region where light can pass through the light control film, the at least one independent bead spacer is embedded in and held immovable by the alignment layer in a random position of a planar portion of the first laminate but not embedded in the alignment layer in the second laminate, and the alignment layer is thinner at the random position due to the at least one independent bead spacer being embedded in the alignment layer.

2. The light control film according to claim 1,
wherein the plurality of bead spacers are formed of photoresist resin and the proportion of the occupied area is 0.5% to 10% inclusive.

3. The light control film according to claim 1,
wherein the liquid crystal layer is a guest-host type liquid crystal layer containing a dichroic dye.

4. Laminated glass in which the light control film according to claim 1 is sandwiched by sheets of plate glass.

5. The light control film according to claim 2,
wherein the liquid crystal layer is a guest-host type liquid crystal layer containing a dichroic dye.

6. The light control film according to claim 1,
wherein the liquid crystal layer is a guest-host type liquid crystal layer containing a dichroic dye.

7. Laminated glass in which the light control film according to claim 2 is sandwiched by sheets of plate glass.

8. Laminated glass in which the light control film according to claim 1 is sandwiched by sheets of plate glass.

9. Laminated glass in which the light control film according to claim 3 is sandwiched by sheets of plate glass.

10. Laminated glass in which the light control film according to claim 5 is sandwiched by sheets of plate glass.

11. Laminated glass in which the light control film according to claim 6 is sandwiched by sheets of plate glass.

* * * * *